(12) United States Patent
Sugawara

(10) Patent No.: US 11,105,235 B2
(45) Date of Patent: Aug. 31, 2021

(54) EXHAUST GAS PURIFICATION CATALYST DEVICE

(71) Applicant: CATALER CORPORATION, Kakegawa (JP)

(72) Inventor: Ko Sugawara, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 187 days.

(21) Appl. No.: 16/606,362

(22) PCT Filed: Mar. 30, 2018

(86) PCT No.: PCT/JP2018/013900
§ 371 (c)(1),
(2) Date: Oct. 18, 2019

(87) PCT Pub. No.: WO2018/207497
PCT Pub. Date: Nov. 15, 2018

(65) Prior Publication Data
US 2021/0189930 A1 Jun. 24, 2021

(30) Foreign Application Priority Data
May 11, 2017 (JP) .................... 2017-094559

(51) Int. Cl.
*F01N 3/022* (2006.01)
*F01N 3/035* (2006.01)
(Continued)

(52) U.S. Cl.
CPC ....... *F01N 3/0222* (2013.01); *B01D 46/2429* (2013.01); *B01J 35/1076* (2013.01);
(Continued)

(58) Field of Classification Search
CPC ..... F01N 3/0222; F01N 3/28; B01D 46/2429; B01D 2046/2437; B01J 35/1076
(Continued)

(56) References Cited

U.S. PATENT DOCUMENTS 4,857,089 A * 8/1989 Kitagawa ............... F01N 3/035
55/523
6,753,294 B1 * 6/2004 Brisley ................. F01N 3/0231
502/439
(Continued)

FOREIGN PATENT DOCUMENTS

EP 2 158 956 A1 3/2010
EP 2 216 085 A1 8/2010
(Continued)

OTHER PUBLICATIONS

"Bubble-Point Test Method", Aerospace Recommended Practice, Society of Automotive Engineers, New York, US, No. 901, Mar. 1, 1968, pp. 1-12.
(Continued)

*Primary Examiner* — Tom P Duong
(74) *Attorney, Agent, or Firm* — Oliff PLC

(57) ABSTRACT

An exhaust gas purification catalyst device includes a honeycomb base material and an inlet-side coat layer, wherein: the honeycomb base material includes a plurality of cells partitioned by porous partition walls, the plurality of cells including inlet-side cells and outlet-side cells and being configured such that exhaust gas that has flowed into the inlet-side cells passes through the partition walls and is exhausted from the outlet-side cells; and the inlet-side coat layer is present on the surface sides of the partition walls of the inlet-side cells, with the proportion of 4-9 μm throughpores in the through-pore diameter distribution of the partition walls being at least 80 vol %, and the peak pore diameter measured using a mercury porosimeter being at
(Continued)

least 3.0 µm greater than the peak through-pore diameter measured using a perm porometer.

11 Claims, 9 Drawing Sheets

(51) Int. Cl.
  *B01J 35/10* (2006.01)
  *B01D 46/24* (2006.01)
  *F01N 3/28* (2006.01)
(52) U.S. Cl.
  CPC .............. *F01N 3/035* (2013.01); *F01N 3/28* (2013.01); *B01D 2046/2437* (2013.01)
(58) Field of Classification Search
  USPC ........................... 428/116; 422/180; 55/523
  See application file for complete search history.

(56) References Cited

U.S. PATENT DOCUMENTS

| | | | |
|---|---|---|---|
| 7,772,151 B2 * | 8/2010 | Li | F01N 3/035 |
| | | | 502/339 |
| 8,496,883 B2 * | 7/2013 | Mizutani | B01D 46/2429 |
| | | | 422/180 |
| 8,591,820 B2 * | 11/2013 | Boger | F01N 3/2066 |
| | | | 422/180 |
| 9,623,359 B2 * | 4/2017 | Toyoshima | C04B 35/565 |
| 2004/0254073 A1 * | 12/2004 | Wei | B01D 53/9431 |
| | | | 502/303 |
| 2006/0057046 A1 * | 3/2006 | Punke | B01J 23/42 |
| | | | 423/215.5 |
| 2006/0107641 A1 | 5/2006 | Kasai et al. | |
| 2007/0110650 A1 * | 5/2007 | Pfeifer | B01D 53/9431 |
| | | | 423/213.5 |
| 2009/0142543 A1 | 6/2009 | Suwabe et al. | |
| 2010/0058745 A1 * | 3/2010 | Kim | B01D 53/944 |
| | | | 60/297 |
| 2011/0179777 A1 * | 7/2011 | Chandler | F01N 3/10 |
| | | | 60/297 |
| 2012/0240538 A1 | 9/2012 | Isoda et al. | |
| 2012/0240541 A1 | 9/2012 | Isoda et al. | |
| 2012/0240542 A1 | 9/2012 | Kikuchi | |
| 2013/0019579 A1 | 1/2013 | Okazaki et al. | |

FOREIGN PATENT DOCUMENTS

| | | |
|---|---|---|
| EP | 2 556 876 A1 | 2/2013 |
| EP | 2 918 566 A1 | 9/2015 |
| JP | 2006-007117 A | 1/2006 |
| JP | 2006-095352 A | 4/2006 |
| JP | 2009-119430 A | 6/2009 |
| JP | 2010-269270 A | 12/2010 |
| JP | 2012-200642 A | 10/2012 |
| JP | 2012-200670 A | 10/2012 |
| JP | 2014-184356 A | 10/2014 |
| JP | 2014-188466 A | 10/2014 |
| WO | 2008/047558 A1 | 4/2008 |
| WO | 2011/125797 A1 | 10/2011 |

OTHER PUBLICATIONS

Dec. 11, 2020 Extended Search Report issued in European Patent Application No. 18799107.0.
May 26, 2020 Office Action issued in Indian Patent Application No. 201917045050.
Jun. 19, 2018 International Search Report issued in International Patent Application No. PCT/JP2018/013900.
Jun. 19, 2018 Written Opinion of the International Searching Authority issued in International Patent Application No. PCT/JP2018/013900.

* cited by examiner

Substrate (average pore diameter: 12 μm)

Substrate (average pore diameter: 10.5 μm)

Example 8

(a) Example 1

(b) Example 4

EXHAUST GAS PURIFICATION CATALYST DEVICE

FIELD

The present invention relates to an exhaust gas purification catalyst device.

BACKGROUND

The requirements stipulated by emission regulations have become increasingly rigorous each year, and the requirements placed on the posttreatment systems of internal combustion engines such as exhaust gas purification catalyst devices are also becoming extremely demanding. In particular, regulations relating to the removal of particulate matter (PM) contained in the exhaust gas discharged from diesel engines are tending to become increasingly severe around the world. Under such circumstances, known examples of exhaust gas purification filters for collecting and removing PM include diesel particulate filters (DPF) and gasoline particulate filters (GPF).

Honeycomb structures, for example, are known as exhaust gas purification filters in which a plurality of cells partitioned by porous partition walls include inlet-side cells, which open on the upstream side of exhaust gas flow and are sealed on the downstream side, and outlet-side cells, which are sealed on the upstream side of exhaust gas flow and open on the downstream side.

For example, PTL1 describes an exhaust gas purification structure comprising a honeycomb structure and having a heat-resistant substrate in which adjacent pores are blocked on alternatingly different one ends thereof and an oxidation catalyst supported on porous walls that composes this substrate, wherein this oxidation catalyst is supported on the surface layer on the side that is open in the direction of any of the walls.

PTL2 describes a honeycomb structure filter provided with a filter substrate comprised of a porous body, an inflow side gas flow path in which the gas inflow side end is open and an outflow side gas flow path in which the outflow side end is open, and a partition wall that purifies exhaust gas by allowing to pass there through provided between the inflow side gas flow path and the outflow side gas flow path, wherein the average pore diameter of the partition wall is 5 µm or more to 50 µm or less, and a porous membrane having an average pore diameter of 0.05 µm or more to 5 µm or less and containing a precious metal is provided on the inner wall of the inflow side gas flow path.

PTL3 describes an exhaust gas purification filter provided with a honeycomb structure portion having a porous partition wall extending from an inflow side end surface to an outflow side end surface that partitions and forms a plurality of cells that serve as an exhaust gas flow path, a plugged portion disposed on an outflow end side opening of inlet cells, which are prescribed cells, and in inflow end side opening of outlet cells, which are the remainder of the cells, a surface collection layer disposed on the surfaces of the inlet side cells of the partition wall of the honeycomb structure portion, and a catalyst for exhaust gas purification formed on at least one side selected from the group consisting of the inner surface of pores formed by the surface collection layer and the surface of the outlet cell side of the partition wall, wherein the supported amount of catalyst to a location 50 mm from a the outflow end surface of the honeycomb structure portion is smaller than the supported amount of catalyst on the side upstream therefrom.

PTL4 describes a low temperature oxidation catalyst obtained by supporting a precious metal onto a support comprised of a metal oxide containing $CeO_2$ followed by carrying out reduction treatment at a temperature within the range of 600 to 800° C. in a reducing atmosphere, carrying out oxidation treatment within the range of 600 to 800° C. in an oxidizing atmosphere, and further carrying out reduction treatment at a temperature within the range of 600 to 800° C. The invention according to this PTL4 is described as being intended to purify diesel exhaust gas.

CITATION LIST

Patent Literature

[PTL1] Japanese Unexamined Patent Publication No. 2006-7117
[PTL2] Japanese Unexamined Patent Publication No. 2010-269270
[PTL3] Japanese Unexamined Patent Publication No. 2014-188466
[PTL4] Japanese Unexamined Patent Publication No. 2009-119430

SUMMARY

Technical Problem

The exhaust gas purification filters of the prior art as represented by PTL1 to 4 tend to cause poor mileage due to high resistance to the passage of exhaust gas and high pressure loss. When these exhaust gas purification filters are used continuously, the collected PM may accumulate within the filter resulting in a further increase in pressure loss.

The present invention was conceived in an attempt to improve the aforementioned circumstances. Thus, an object of the present invention is to provide an exhaust gas purification catalyst device that has low pressure loss when used to purify exhaust gas and inhibits increases in pressure loss caused by accumulation of PM even in the case of having used continuously for a long period of time.

Solution to Problem

The present invention is as described below.

[1] An exhaust gas purification catalyst device having a honeycomb substrate and an inlet side coat layer; wherein the honeycomb substrate has a plurality of cells partitioned by porous partition walls, and this plurality of cells includes inlet side cells, which are open on the upstream side of exhaust gas flow and sealed on the downstream side, and outlet side cells, which are sealed on the upstream side of exhaust gas flow and open on the downstream side, and are configured such that exhaust gas that has flowed into the inlet side cells as a result thereof passes through the partition walls and is discharged from the outlet side cells, the inlet side coat layer is present on the surface sides of the partition walls of the inlet side cells the proportion of through-pores having a diameter of 4 µm or more to 9 µm or less in the distribution of the through-pore diameter of the partition walls as measured according to the bubble point method using a perm-porometer is 80% by volume or more, and the peak pore diameter as measured according to the mercury intrusion method using a mercury porosimeter is 3.0 µm or more larger than the peak through-pore diameter measured according to the bubble point method using a perm-porometer.

[2] The catalyst device described in [1], wherein the inlet side coat layer is present only within a range from the partition wall surfaces of the inlet side cells to a depth of 30% of the partition wall thickness.

[3] The catalyst device described in [2], wherein the inlet side coat layer is present only within a range from the partition wall surfaces of the inlet side cells to a depth of 10% of the partition wall thickness.

[4] The catalyst device described in any of [1] to [3], wherein the peak pore diameter measured according to the mercury intrusion method using a mercury porosimeter is 9 µm or more.

[5] The catalyst device described in any of [1] to [4], wherein the inlet side coat layer is present over a length of 70% or more of the length of the honeycomb substrate from the upstream side end of exhaust gas flow of the honeycomb substrate.

[6] The catalyst device described in any of [1] to [5], wherein the inlet side coat layer is present over a length of 98% or more of the length of the honeycomb substrate from the upstream side end of exhaust gas flow of the honeycomb substrate.

[7] The catalyst device described in any of [1] to [6], further having an outlet side coat layer present on the surfaces or insides of the partition walls of the outlet side cells.

[8] A method for producing the exhaust gas purification catalyst device described in any of [1] to [7], wherein the production method includes forming a slurry coat layer by coating a slurry for coat layer formation within the inlet side cells of the honeycomb substrate and baking the honeycomb substrate after forming the slurry coat layer, and the slurry for coat layer formation contains inorganic oxide particles and a pore forming material.

[9] The method described in [8], wherein the pore forming material is an organic polymer particle.

[10] The method described in [8] or [9], wherein the average particle diameter of the pore forming material is 10 nm or more to 500 nm or less.

[11] The method described in any of [8] to [10], wherein the amount of the slurry coat layer per unit volume of the honeycomb substrate after baking is 1 g/L or more to 15 g/L or less.

Advantageous Effects of Invention

The exhaust gas purification catalyst device of the present invention has low pressure loss when used to purify exhaust gas and inhibits increases in pressure loss caused by accumulation of PM even in the case of having used continuously for a long period of time.

DESCRIPTION OF EMBODIMENTS

<Exhaust Gas Purification Catalyst Device>

The exhaust gas purification catalyst device of the present invention is:

an exhaust gas purification catalyst device having a honeycomb substrate and an inlet side coat layer, wherein the honeycomb substrate has a plurality of cells partitioned by porous partition walls, and this plurality of cells includes inlet side cells, which are open on the upstream side of exhaust gas flow and sealed on the downstream side, and outlet side cells, which are sealed on the upstream side of exhaust gas flow and open on the downstream side, and are configured such that exhaust gas that has flowed into the inlet side cells as a result thereof passes through the partition walls and is discharged from the outlet side cells, the inlet side coat layer is present on the surface sides of the partition walls of the inlet side cells the proportion of through-pores having a diameter of 4 µm or more to 9 µm or less in the distribution of the through-pore diameter of the partition walls as measured according to the bubble point method using a perm-porometer is 80% by volume or more, and the peak pore diameter as measured according to the mercury intrusion method using a mercury porosimeter is 3.0 μm or more larger than the peak through-pore diameter measured according to the bubble point method using a perm-porometer.

Figure 1:
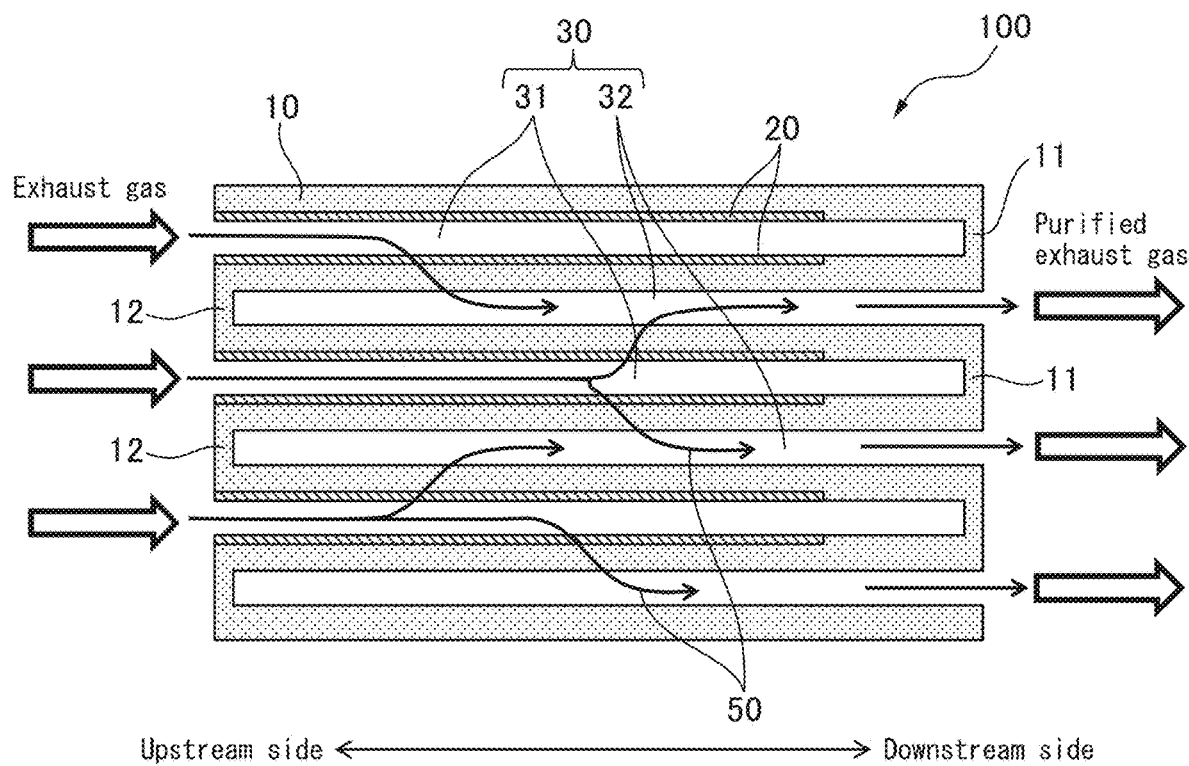
FIG. 1 is a schematic cross-sectional view for explaining the basic configuration of the exhaust gas purification catalyst device of the present invention.

A general overview of the basic configuration of the exhaust gas purification catalyst device of the present invention is shown in the cross-sectional view of FIG. 1. As shown in FIG. 1, the exhaust gas purification catalyst device (100) of the present invention has a honeycomb substrate (10) and an inlet side coat layer (20).

The honeycomb substrate (10) has a plurality of cells (30) partitioned by porous partition walls. The plurality of cells (30) includes inlet side cells (31) and outlet side cells (32). Although the inlet side cells (31) are open on the upstream side of exhaust gas flow, the inlet side cells (31) are sealed by sealing portions (11) on the downstream side. Although the outlet side cells (32) are sealed by sealing portions (12) on the upstream side of exhaust gas flow, the outlet side cells (32) are open on the upstream side.

According to the aforementioned configuration, exhaust gas that has flowed into the inlet side cells (31) of the honeycomb substrate (10) passes through the partition walls of the honeycomb substrate (10) and is discharged from the outlet side cells (32) in the manner of the exhaust gas flow (50) indicated by the arrows.

The inlet side coat layer (20) is present on the surface sides of the partition walls of the inlet side cells (31).

Figure 2:
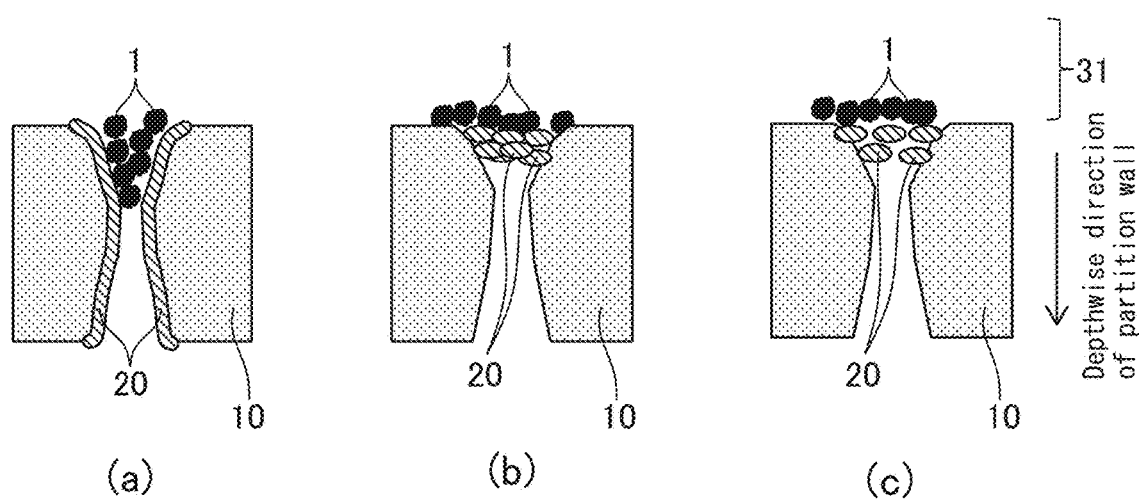
FIG. 2 depicts schematic cross-sectional views for explaining the action and effects of the exhaust gas purification catalyst device of the present invention in comparison with the prior art.

FIG. 2 depicts schematic cross-sectional views of the exhaust gas purification catalyst device of the present invention. FIGS. 2(a) and 2(b) respectively indicate exhaust gas purification catalyst devices of the prior art, while FIG. 2(c) indicates the exhaust gas purification catalyst device of the present invention.

In the exhaust gas purification catalyst device of FIG. 2(a), the inlet side coat layer (20) is present over the entire range extending from the surfaces of the partition walls of the inlet side cells (31) towards the depthwise direction of the partition walls among those walls of the pores possessed by the partition walls of the honeycomb substrate (10). When collection of particulate matter (PM1) is carried out continuously for a long period of time using this exhaust gas purification catalyst device having this type of cross-sectional structure, the PM1 clogs the constricted portions (narrowest portions) of the pores causing the pores to become blocked and leading to a large pressure loss.

In the exhaust gas purification catalyst device of FIG. 2(b), the inlet side coat layer (20) is present only in shallow portions from the surfaces of the partition walls of the inlet side cells (31) towards the depthwise direction of the partition walls. This inlet side coat layer (20) block in pores of the partition walls near the surfaces of the partition walls of the inlet side cells (31) resulting in the greatest pressure loss. When collection of PM1 is carried out continuously for a long period of time using an exhaust gas purification catalyst device having this type of cross-sectional structure, pressure loss becomes even greater due to collection of PM1.

FIG. 2(c) is a schematic cross-sectional view of the typical structure of the exhaust gas purification catalyst device of the present invention. In this exhaust gas purification catalyst device, the inlet side coat layer (20) is present in comparatively shallow portions from the surfaces of the partition walls of the inlet side cells (31) towards the depthwise direction of the partition walls. However, differing from the exhaust gas purification catalyst device shown in FIG. 2(b), the inlet side coat layer (20) has micropores enabling circulation of gas. As a result of having this type of cross-sectional structure, the exhaust gas purification catalyst device of the present invention inhibits blockage of pores by PM1 even if collection of PM1 is carried out continuously for a long period of time. Exhaust gas that has flown in from the inlet side cells (31) is able to pass through the micropores of the inlet side coat layer (20) and pores of the partition walls and easily reach the outlet side cells even after collection of PM1.

The following provides an explanation of the exhaust gas purification catalyst device of the present invention using as an example a preferred embodiment thereof (to be referred to as the "present embodiment").

[Honeycomb Substrate]

The honeycomb substrate in the exhaust gas purification catalyst device of the present embodiment has a plurality of cells partitioned by porous partition walls.

The average pore diameter of the porous partition walls is, for example, 5 μm or more, 8 μm or more, 9 μm or more, 10 μm or more, 11 μm or more or 12 μm or more. If the average pore diameter of the partition walls is 5 μm or more, the honeycomb substrate does not increase pressure loss, thereby making this preferable. The average pore diameter of the partition walls is, for example, 50 μm or less, 40 μm or less, 30 μm or less, 20 μm or less or 15 μm or less. If the average pore diameter of the partition walls is 50 μm or less, the honeycomb substrate has sufficiently high strength, thereby making this preferable. The average pore diameter of the partition walls may be evaluated as peak pore diameter in the distribution of pore diameter as measured according to the mercury intrusion method using a mercury porosimeter. In the case a partition wall has two or more peak pore diameters, the maximum value of the highest peak is taken to be the peak pore diameter of that partition wall.

The plurality of cells in the honeycomb substrate include inlet side cells, which are open on the upstream side of exhaust gas flow and sealed on the downstream side, and outlet side cells, which are sealed on the upstream side of exhaust gas flow and are open on the downstream side. The honeycomb substrate is configured such that exhaust gas flows in from the upstream side ends of the inlet side cells, moves into outlet side cells by passing through the partition walls, and is discharged from the downstream side ends of the outlet side cells. Thus, the inlet side cells and the outlet side cells are alternately adjacent.

When exhaust gas passes through the partition walls, although gas passes through walls of the partition walls, PM in the exhaust gas is blocked without being able to pass through the pores of the partition walls, is unable to move into the outlet side cells and is trapped in the inlet side cells. PM that has been trapped in the inlet side cells is purified by, for example, being burned by a heating process that is carried out periodically.

The cross-sectional shape of the cells in the honeycomb substrate may have an arbitrary shape such as that of a circle, oval, polygon, irregular shape or a combination thereof. Examples of the aforementioned polygon include a triangle, quadrangle (and particularly a square or rectangle), hexagon and octagon.

The cross-sectional area of an individual cell in the honeycomb substrate is, for example, 1 mm$^2$ or more, 2 mm$^2$ or more or 3 mm$^2$ or more, and for example, 7 mm$^2$ or less, 6 mm$^2$ or less or 5 mm$^2$ or less.

The porous partition walls in the honeycomb substrate may be comprised of, for example, a heat-resistant porous material. Examples of heat-resistant porous materials include silicon carbide, cordierite, aluminum titanate, silicon nitride and metal oxide particles.

The shape of the honeycomb substrate may have any arbitrary shape that conforms to the shape of the exhaust system to which the exhaust gas purification catalyst device of the present embodiment is to be applied, such as that of a cylindrical column or polygonal prism. Cases in which the central axis of the honeycomb substrate curves or bends at an intermediate location are also permitted.

The size of the honeycomb substrate is suitably set corresponding to the size of the exhaust system to which it is to be applied. The cross-sectional area of the honeycomb substrate is 8,000 mm$^2$ or more, 10,000 mm$^2$ or more, 15,000 mm$^2$ or more or 20,000 mm$^2$ or more, and 130,000 mm$^2$ or less, 120,000 mm$^2$ or less, 100,000 mm$^2$ or less, 80,000 mm$^2$ or less, 50,000 mm$^2$ or less or 30,000 mm$^2$ or less. The length of the honeycomb substrate is 50 mm or more, 75 mm or more or 100 mm or more, and 400 mm or less, 350 mm or less or 300 mm or less.

[Inlet Side Coat Layer]

The inlet side coat layer in the exhaust gas purification catalyst device of the present embodiment is present on the surface sides of the partition walls of the inlet side cells.

More specifically, the inlet side coat layer is only present within the range from the partition wall surfaces of the inlet side cells towards the depthwise direction of the partition walls to a depth of 30% of the partition wall thickness. The range over which the inlet side coat layer is present only extends from the partition wall surfaces of the inlet side cells towards the depthwise direction of the partition walls to a depth of 25%, a depth of 20%, a depth of 15% or a depth of 10% of the partition wall thickness. As a result of the inlet side coat layer only being present from the partition wall surfaces of the inlet side cells towards the depthwise direction of the partition walls over a shallow range to a depth of 30% of the partition wall thickness, increases in pressure loss are inhibited even if collection of PM is carried out continuously for a long period of time, thereby making this preferable.

On the other hand, the range over which the inlet side coat layer is present extends from the partition wall surfaces of the inlet side cells towards the depthwise direction of the partition walls to 3% or more, 4% or more, 5% or more, 6% or more, 7% or more or 8% or more of the partition wall thickness. As a result of the inlet side coat layer being present only from the partition wall surfaces of the inlet side cells towards the depthwise direction of the partition walls to a depth of 3% or more of the partition wall thickness, PM can be collected at high efficiency and exhaust is highly purified, thereby making this preferable.

The inlet side coat layer being present at a significant length from the upstream side ends of exhaust gas flow of the honeycomb substrate is preferable from the viewpoints of effective collection of PM and the degree of exhaust gas purification. The range over which the inlet side coat layer is present from the upstream side ends of exhaust gas flow extends over a length of 70% or more, 75% or more, 80% or more or 85% or more of the length of the honeycomb substrate. On the other hand, from the viewpoint of efficiency removing PM by burning, the range over which the inlet side coat layer is present from the upstream side ends of exhaust gas flow is a length of 98% or less, 96% or less, 94% or less, 92% or less or 90% or less of the length of the honeycomb substrate.

The inlet side coat layer contains inorganic oxide particles and may further optionally contain components such as a precious metal or inorganic binder. In the case the inlet side coat layer contains a precious metal, the precious metal is supported on a portion or entirety of the aforementioned metal oxide particles.

The inorganic oxide particles in the inlet side coat layer are particles comprised of a metal oxide containing one or more types of metal atoms selected from the group consisting of, for example, aluminum, zirconium, cerium, yttrium and rare earth elements. The precious metal is one or more types selected from, for example, palladium, platinum or rhodium. Examples of inorganic binder include alumina sol and titania sol.

The inlet side coat layer has micropores. The micropores in the inlet side coat layer are pores derived from a pore forming material contained by a slurry for coat layer formation to be subsequently described. The distribution of pore diameter of the micropores possessed by the inlet side coat layer in the exhaust gas purification catalyst device of the present embodiment can be estimated according to the distribution of through-pore diameter as measured according to the bubble point method using a perm-porometer, a description of which is subsequently provided.

[Outlet Side Coat Layer]

The exhaust gas purification catalyst device of the present embodiment may have an outlet side coat layer on the honeycomb substrate in addition to the inlet side coat layer.

The outlet side coat layer may be present on the surfaces of the partition walls or within the partition walls of the outlet side cells. The outlet side coat layer is only present within the range from the partition wall surfaces of the outlet side cells towards the depthwise direction of the partition walls to depth of 100%, depth of 50%, depth of 40%, depth of 30%, depth of 20% or depth of 10% of the partition wall thickness. The outlet side coat layer is present from the downstream side ends of exhaust gas flow of the honeycomb substrate over a length of 50% or less, 45% or less, 40% or less, 35% or less or 30% or less of the length of the honeycomb substrate.

The outlet side coat layer contains inorganic oxide particles and further optionally contains components such as a precious metal or inorganic binder. In the case the inlet side coat layer contains a precious metal, the precious metal is supported on a portion or entirety of the aforementioned metal oxide particles.

Although not required, the outlet side coat layer may have micropores.

The components and configuration of the outlet side coat layer may be the same as or different from those of the inlet side coat layer.

[Particle Diameter Distribution of Exhaust Gas Purification Catalyst Device]

The exhaust gas purification catalyst device of the present embodiment is such that:

the proportion of through-pores having a diameter of 4 µm or more to 9 µm or less in the distribution of the through-pore diameter of the partition walls as measured according to the bubble point method using a perm-porometer is 80% by volume or more, and the peak pore diameter as measured according to the mercury intrusion method using a mercury porosimeter is 3.0 µm or more larger than the peak through-pore diameter measured according to the bubble point method using a perm-porometer.

The distribution of through-pore diameter of the partition walls as measured according to the bubble point method using a perm-porometer is the distribution of pore diameter that reflects the diameter of the narrowest portion when pores passing through the partition walls are observed from the partition wall surfaces of the inlet side cells to the partition wall surfaces of the outlet side cells. The distribution of through-pore diameter in the case the through-pores having a constricted shape starting at an intermediate point in the through-pores in the manner of the neck of an hourglass indicates the distribution of diameter at the narrowest portion of the constricted portion of the through-pores.

The distribution of pore diameter as measured according to the mercury intrusion method using a mercury porosimeter is the distribution that reflects the diameter of the entire region from the partition wall surfaces of the inlet side cells to the partition wall surfaces of the outlet side cells for all pores other than closed pores (including pores that do not pass completely through).

Thus, the proportion of through-pores having a diameter of the narrowest portion thereof of 4 μm or more to 9 μm or less in the distribution of through-pore diameter of the partition walls as measured according to the bubble point method using a perm-porometer being 80% by volume or more means that the proportion of through-pores having a diameter of the narrowest portion thereof of 4 μm or more to 9 μm or less is 80% or more of the volume of all through-pores. This proportion is evaluated as the proportion of the area of a region where particle diameter is 4 μm or more to 9 μm or less in a graph represented by plotting through-pore diameter measured according to the bubble point method using a perm-porometer on the horizontal axis and plotting pore frequency, which is a dimensionless number, on the vertical axis. The aforementioned pore frequency is the amount corresponding to the gas flow rate when measuring the distribution of through-pore diameter.

The peak pore diameter as measured according to the mercury intrusion method using a mercury porosimeter being 3.0 μm or more larger than the than the peak through-pore diameter measured according to the bubble point method using a perm-porometer means that there is a large difference between the average pore diameter of all pores of the partition walls and the average value of the diameter of the narrowest portions of the through-pores. In other words, this means that the average pore diameter of all pores of the partition walls is sufficiently large and the diameter of the narrowest portions of the through-pores is sufficiently small. Since the circulation of exhaust gas is not impaired if the average pore diameter of all pores is sufficiently large, pressure loss can be reduced. If the diameter of the narrowest portions of the through-pores is sufficiently small, collection of PM can be carried out effectively.

The distribution of through-pore diameter of the partition walls of the exhaust gas purification catalyst device of the present embodiment as measured according to the bubble point method using a perm-porometer is presumed to reflect the diameter distribution of the micropores possessed by the inlet side coat layer. Thus, the regions of the through-holes of the partition walls having the narrowest diameter is present within a range extending from the partition wall surfaces of the inlet side cells towards the depthwise direction of the partition walls preferably to a depth of 30% of the partition wall thickness. In particular, the portions of the through-pores of the partition walls having the narrowest diameter are present within a range extending from the partition wall surfaces of the inlet side cells towards the depthwise direction of the partition walls to depth of 25%, depth of 20%, depth of 15% or depth of 10%.

The proportion of through-pores having a diameter of 4 μm or more to 9 μm or less in the distribution of through-pore diameter of the partition walls is 80% by volume or more, 85% by volume or more, 90% by volume or more, 95% by volume or more or 100% by volume. An exhaust gas purification catalyst device having such a through-pore diameter distribution inhibits increases in pressure loss even if collection of PM is carried out continuously for a long period of time.

The difference between peak pore diameter measured according to the mercury intrusion method using a mercury porosimeter and peak through-pore diameter measured according to the bubble point method using a pore-porometer for the exhaust gas purification catalyst device of the present embodiment is 3.0 μm or more, 3.5 μm or more, 4.0 μm or more, 4.5 μm or more or 5.0 μm or more. This value is 10.0 μm or less, 9.0 μm or less, 8.0 μm or less or 7.0 μm or less.

From the viewpoint of ensuring favorable exhaust gas circulation, the peak pore diameter for the exhaust gas purification catalyst device of the present embodiment as measured according to the mercury intrusion method using a mercury porosimeter is 9 μm or more, 10 μm or more, 11 μm or more or 12 μm or more. From the viewpoint of obtaining an effective filtering effect, this value is 50 μm or less, 40 μm or less, 30 μm or less, 20 μm or less or 15 μm or less.

<Method for Producing Exhaust Gas Purification Catalyst Device>

The exhaust gas purification catalyst device of the present invention as previously described is produced according to, for example, the method indicated below.

The method for producing an exhaust gas purification catalyst device includes forming a slurry coat layer by coating a slurry for coat layer formation within the inlet side cells of the honeycomb substrate, and baking the honeycomb substrate following formation of the slurry coat layer, wherein the aforementioned slurry for coat layer formation contains inorganic oxide particles and a pore forming material.

The following provides an explanation of the method for producing the exhaust gas purification catalyst device of the present invention using as an example a preferred embodiment thereof (to be referred to as the "present embodiment").

[Honeycomb Substrate]

The honeycomb substrate used in the method for producing the exhaust gas purification catalyst device of the present embodiment is used by suitably selecting from among that previously explained as a honeycomb substrate in the exhaust gas purification catalyst device of the present embodiment.

[Slurry for Coat Layer Formation]

The slurry for coat layer formation used in the method for producing the exhaust gas purification catalyst device of the present embodiment contains inorganic oxide particles and a pore forming material. The slurry for coat layer formation further optionally contains components such as a precious metal catalyst, inorganic binder or viscosity modifier. In the case the inlet side coat layer contains a precious metal catalyst, the precious metal catalyst is supported on a portion of the entirety of the aforementioned inorganic oxide particles.

The inorganic oxide particles, precious metal catalyst and inorganic binder in the slurry for coat layer formation may respectively be the same as or different from the inorganic oxide particles, precious metal catalyst and inorganic binder contained in the inlet side coat layer.

In the slurry for coat layer formation, the particle diameter of inorganic oxide particles supporting or not supporting the precious metal catalyst as the median diameter thereof is, for example, 0.1 μm or more, 0.3 μm or more, 0.5 μm or more, 0.8 μm or more or 1.0 μm or more, and for example, 10 μm or less, 5.0 μm or less, 3.0 μm or less, 2.0 μm or less, 1.5 μm or less or 1.0 μm or less.

The pore forming material in the slurry for coat layer formation has the function of being burned off in the baking step after coating to form micropores in the inlet side coat layer. Thus, the pore forming material consists of particles that are stably present as primary particles or secondary particles in the slurry for coat layer formation and slurry coat layer and are comprised of a material that is easily burned off by baking.

The pore forming material contained in the slurry for coat layer formation consists of, for example, organic polymer particles. Examples of organic polymer particles include (meth)acrylic resin particles, styrene-(meth)acrylic resin particles, polyurethane resin particles, maleic acid resin particles, styrene-maleic acid resin particles, alkyd resin particles, rosin-modified phenolic resin particles and ketone resin particles.

From the viewpoint of assuring effective collection of PM, the average particle diameter of the pore forming material as the median diameter thereof is, for example, 500 nm or less, 400 nm or less, 300 nm or less, 200 nm or less or 100 nm or less. From the viewpoint of ensuring favorable exhaust gas circulation even after PM collection, the median diameter of the pore forming material is 10 nm or more, 20 nm or more, 40 nm or more, 60 nm or more, 80 nm or more or 100 nm or more.

The pore forming material is provided to prepare the slurry for coat layer formation as an emulsion.

From the viewpoints of reliably collecting PM and ensuring mechanical strength of the inlet side coat layer, the content ratio of the pore forming material in the slurry for coat layer formation is, for example, 50% by weight or less, 45% by weight or less, 40% by weight or less, 35% by weight or less or 30% by weight or less in the case of a value of 100% by weight for the total solid content of the slurry. On the other hand, from the viewpoint of forming effective micropores to ensure favorable circulation of exhaust gas following collection of PM, the content ratio of the pore forming material in the case of a value of 100% by weight for the total solid content of the slurry for coat layer formation is, for example, 5% by weight or more, 10% by weight or more, 12% by weight or more, 15% by weight or more, 18% by weight or more or 20% by weight or more.

The dispersion medium of the slurry for coat layer formation is an aqueous medium and examples thereof include water and mixtures of water and water-soluble organic solvents. The dispersion medium of the slurry for coat layer formation is typically water.

The range over which the inlet side coat layer is present from the partition wall surfaces of the inlet side cells towards the depthwise direction of the partition walls can be adjusted by suitably altering at least one of the solid concentration and viscosity of the slurry for coat layer formation. Thus, the solid concentration and viscosity of the slurry for coat layer formation are suitably set by a person with ordinary skill in the art corresponding to the desired range over which the inlet side coat layer is present. Viscosity of the slurry for coat layer formation is adjusted by adding, for example, a water-soluble polymer such as hydroxyethyl cellulose to the slurry.

[Coating of Slurry for Coat Layer Formation on Honeycomb Substrate]

The slurry for coat layer formation is coated within the inlet side cells of the honeycomb substrate to form a slurry coat layer. Coating is carried out over a desired length of the inlet side coat layer from the upstream side end of exhaust gas flow. The coating range extends over a length of, for example, 70% or more, 75% or more, 80% or more or 85% or more, and for example, 98% or less, 96% or less, 94% or less, 92% or less or 90% or less of the length of the honeycomb substrate from the upstream side end of exhaust gas flow of the inlet side coat layer.

Examples of coating methods include the push-up method, suction method and dipping method. In the push-up method, coating is carried out by pushing up the slurry for coat layer formation from the lower open ends of the inlet side cells to the honeycomb substrate that is held such that the open ends of the inlet side cells are facing downward and the cells are facing vertically. In the suction method, coating is carried out by arranging the slurry for coat layer formation at the open ends of the inlet side cells of the honeycomb substrate that is held such that the cells are facing vertically followed by suctioning from the opposing ends of the outlet side cells. In the dipping method, coating is carried out by dipping the honeycomb substrate in the slurry for coat layer formation from the open ends of the inlet side cells.

The amount of slurry coat layer formed by coating is 1 g/L or more, 3 g/L or more, 5 g/L or more or 7 g/L or more and 15 g/L or less, 12 g/L or less, 10 g/L or less or 8 g/L or less as the amount of the slurry coat layer after baking per unit volume of the honeycomb substrate.

The slurry coat layer may also be formed within the outlet side cells of the honeycomb substrate as necessary by coating the slurry for coat layer formation. The slurry for coat layer formation coated within the outlet side cells may be the same as or different from the slurry coated within the inlet side cells.

[Baking of Honeycomb Substrate after Forming Slurry Coat Layer]

The exhaust gas purification catalyst device of the present embodiment can be obtained by baking the honeycomb substrate after forming the slurry coat layer.

The baking step is carried out by heating the honeycomb substrate after having formed the slurry coat layer in a suitable environment such as an inert atmosphere or oxidizing atmosphere.

The heating temperature in the baking step is, for example, 400° C. or higher, 500° C. or higher or 600° C. or higher, and for example, 800° C. or lower, 700° C. or lower or 600° C. or lower. The heating time is, for example, 5 minutes or more, 30 minutes or more or 1 hour or more, and for example, 20 hours or less, 10 hours or less, 8 hours or less or 6 hours or less.

EXAMPLES

Example 1

(1) Preparation of Coating Slurry

An aqueous solution containing Pt nitrate and Pd nitrate was impregnated with alumina powder followed by drying and baking to obtain Pt—Pd/Al powder loaded with 3% by weight of Pt and 1% by weight of Pd as the weight ratio thereof based on the weight of alumina. 100 g of this Pd/Pt—Al powder were mixed with 50 g of ceria-zirconia complex oxide powder followed by adjusting the average particle diameter to 1 μm by milling to obtain a mixed powder. 10 g of alumina sol binder and 300 g of pure water were added to 150 g of this mixed powder followed by mixing to obtain a slurry.

Styrene-acrylic resin particles as pore forming material were added to the aforementioned slurry followed by further adding hydroxyethyl cellulose to adjust the viscosity and obtain a coating slurry. The average particle diameter of the styrene-acrylic resin particles used was 100 nm and the ratio at which the styrene-acrylic resin particles were used was 30% by weight based on the total solid content in the resulting coating slurry.

(2) Production of Exhaust Gas Purification Catalyst Device

Figure 3:
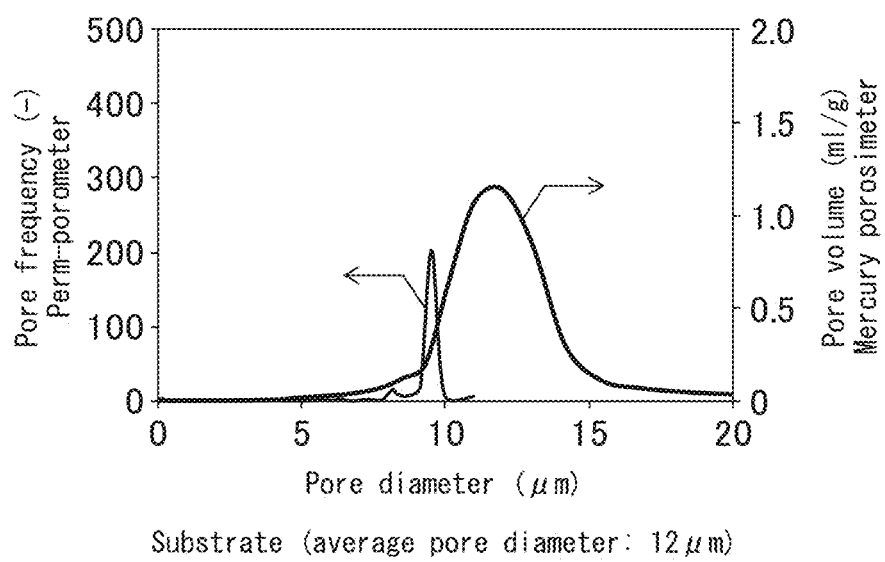
FIG. 3 is a graph indicating the distribution of through-pore diameter of partition walls according to a perm-porometer and the distribution of pore diameter according to a mercury porosimeter measured for the honeycomb substrate s used in Examples 1 to 4 and Comparative Examples 1 to 4.

A cylindrical SiC honeycomb structure having a diameter of 160 mm and length of 135 mm was used as a substrate (diesel microparticle collection filter, average pore diameter: 12 (nominal value), porosity: 42% by volume (nominal value)). The distribution of through-pore diameter of the partition walls as determined with a perm-porometer and the distribution of particle diameter as determined with a mercury porosimeter when measuring the substrate as the measurement target are shown in FIG. 3.

After respectively coating the aforementioned coating slurry onto the substrate to 90% of the length of the substrate from the upstream side of exhaust gas flow and to 30% of the length of the substrate from the downstream side, the substrate was baked for 1 hour at 500° C. to form a coat layer from the surface of the substrate towards the depthwise direction and produce the exhaust gas purification catalyst device. This exhaust gas purification catalyst device is presumed to have a cross-sectional structure like that shown in FIG. 2(c).

(3) Evaluation of Exhaust Gas Purification Catalyst Device

The exhaust gas purification catalyst device produced in the manner described above was evaluated as indicated below. The results are collectively shown in Table 2 and Table 3.

(3-1) Range of Coat Layer

A backscattered electron image of the exhaust gas purification catalyst device produced above was obtained with an SEM provided with a backscattered electron detector. As a result of analyzing this backscattered electron image, the depth from the surfaces of the inlet side cells where the coat layer is present was determined and the resulting value was taken to be the range over which the coat layer is present.

(3-2) Analysis of Particle Diameter with Mercury Porosimeter

Figure 4:
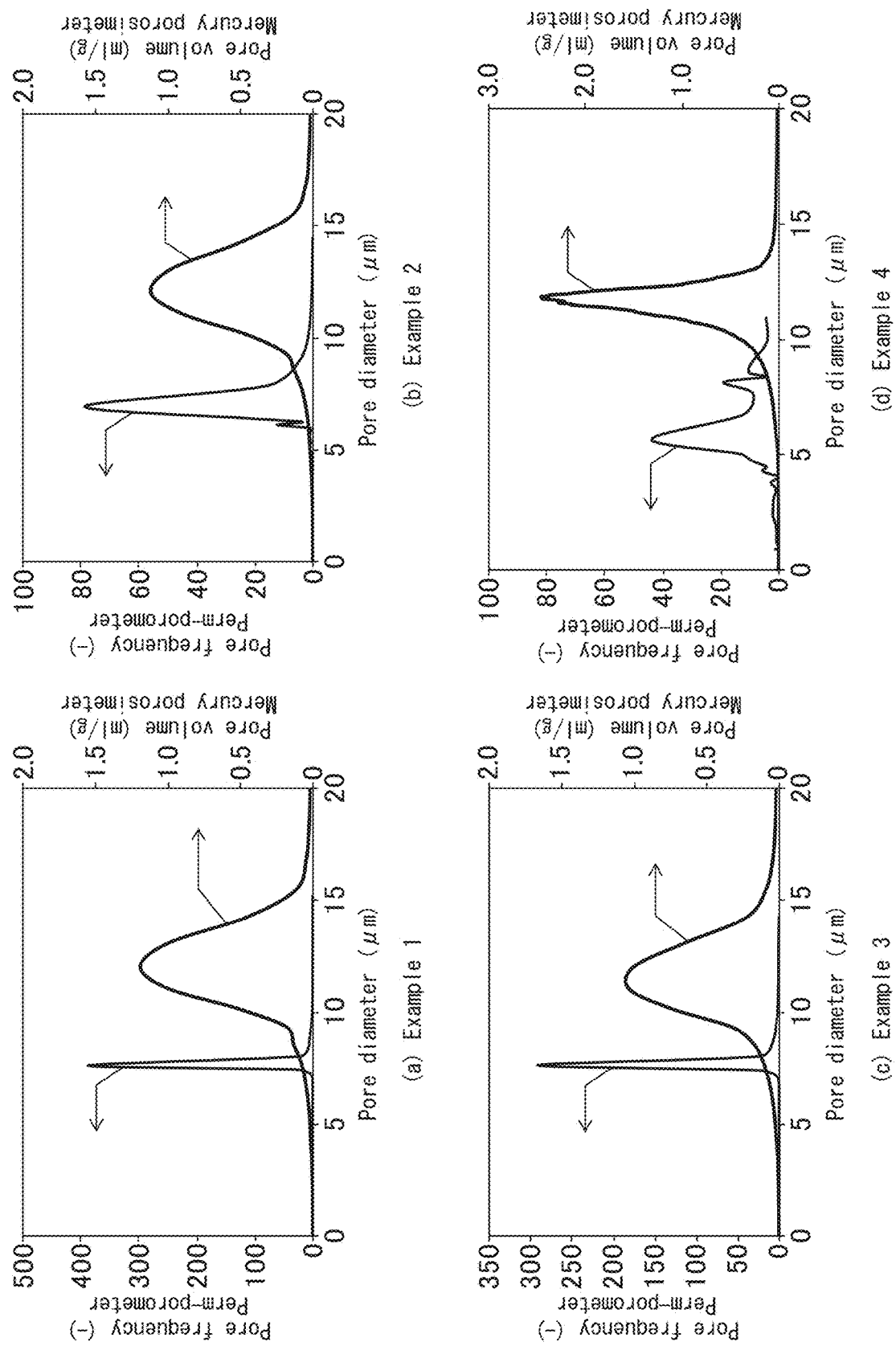
FIG. 4 depicts graphs indicating the distribution of through-pore diameter of partition walls according to a perm-porometer and the distribution of pore diameter according to a mercury porosimeter measured for the exhaust gas purification catalyst devices obtained in Examples 1 to 4.

The distribution of pore diameter of the exhaust gas purification catalyst device produced above was measured according to the mercury intrusion method using a mercury porosimeter. The pore diameter corresponding to the maximum value of the highest peak in this distribution of pore diameter was determined as the peak pore diameter. The measured distribution of pore diameter is shown in FIG. 4(a).

(3-3) Analysis of Through-Pore Diameter with Perm-Porometer

The distribution of through-pore diameter of the partition walls was measured for the exhaust gas purification catalyst device produced above according to the bubble point method using a perm-porometer. The volume proportion of those pores having a through-pore diameter of 4 μm or more to 9 μm or less (effective through-pore proportion) was calculated form this distribution of through-pore diameter. Particle diameter corresponding to the maximum value of the highest peak in the aforementioned distribution of through-pore diameter was determined as the peak pore diameter of the partition wall through-pores. The specific measurement conditions were as indicated below.

Apparatus used: Perm-Porometer, Model CFP-1100A, Porous Materials Inc., USA)

Reagent used: Galwick reagent, Porous Materials Inc., USA

Circulating gas: Air

Specific procedure: The exhaust gas purification catalyst device targeted for measurement was cut into about 1 cm cubes followed by carrying out clogging to enable circulating as to only pass through the partition walls. This sample was dipped in a liquid Galwick reagent followed by removing air present in the same by carrying out vacuum degassing. Subsequently, the sample was placed in the measurement apparatus, the gas was allowed to circulate while changing pressure and the gas flow rate was monitored for each pressure. Through-pores enabling circulation of gas at low pressure have a large diameter while through-pores enabling circulation of gas at high pressure have a small diameter.

The distribution of through-pore diameter of the partition walls of the measured honeycomb substrate is shown in FIG. 4(a).

(3-4) Measurement of Pressure Loss

Air was allowed to flow into the exhaust gas purification catalyst device produced above from the upstream side of exhaust gas flow at a flow rate of 7,000 L/min, and the pressure loss when the air that passed through the partition walls was discharged from the downstream side was measured and taken to be the value of pressure loss prior to PM accumulation.

The exhaust gas purification catalyst device produced above was mounted in the exhaust system of a diesel engine having a displacement of 3,000 cc and the engine was operated for 2 hours under conditions of 2,000 rpm and 60 Nm. Subsequently, the catalyst device was recovered, pressure loss was measured in the same manner as described above, and the resulting value was taken to be the pressure loss following PM accumulation.

Examples 2 to 4 and Comparative Examples 2 and 3

Coating slurries were prepared in the same manner as Example 1 with the exception of using the amounts of pore forming material as shown in Table 1 and suitably changing viscosity by changing the added amount of hydroxyethyl cellulose. Exhaust gas purification catalyst devices were produced and evaluated in the same manner as Example 1 with the exception of using these slurries and making the coating length from the upstream side of exhaust gas flow to be as shown in Table 1. The results are collectively shown in Table 2 and Table 3. The distributions of through-pore diameter of the partition walls as determined with a perm-porometer and the distributions of pore diameter as determined with a mercury porosimeter are shown in FIGS. 4(b) to 4(d) and in FIGS. 5(b) and 5(c).

The exhaust gas purification catalyst devices obtained in Examples 2 to 4 are presumed to have a cross-sectional structure like that shown in FIG. 2(c), while the exhaust gas purification catalyst devices obtained in Comparative Examples 2 and 3 are thought to have a cross-sectional structure like that shown in FIG. 2(b).

Comparative Example 1

(1) Preparation of Coating Slurry

A coating slurry was prepared in the same manner as Example 1 with the exception of not using a pore forming material.

(2) Production of Exhaust Gas Purification Catalyst Device

An exhaust gas purification catalyst device was produced by coating the aforementioned coating slurry onto the same honeycomb substrate as that used in Example 1 followed by baking for 1 hour at 500° C. and forming a coat layer from the surface of the substrate towards the depthwise direction. The exhaust gas catalyst purification catalyst device obtained in the present Comparative Example 1 is thought to have a cross-sectional structure like that shown in FIG. 2(a).

(3) Evaluation of Exhaust Gas Purification Catalyst Device

Figure 5:
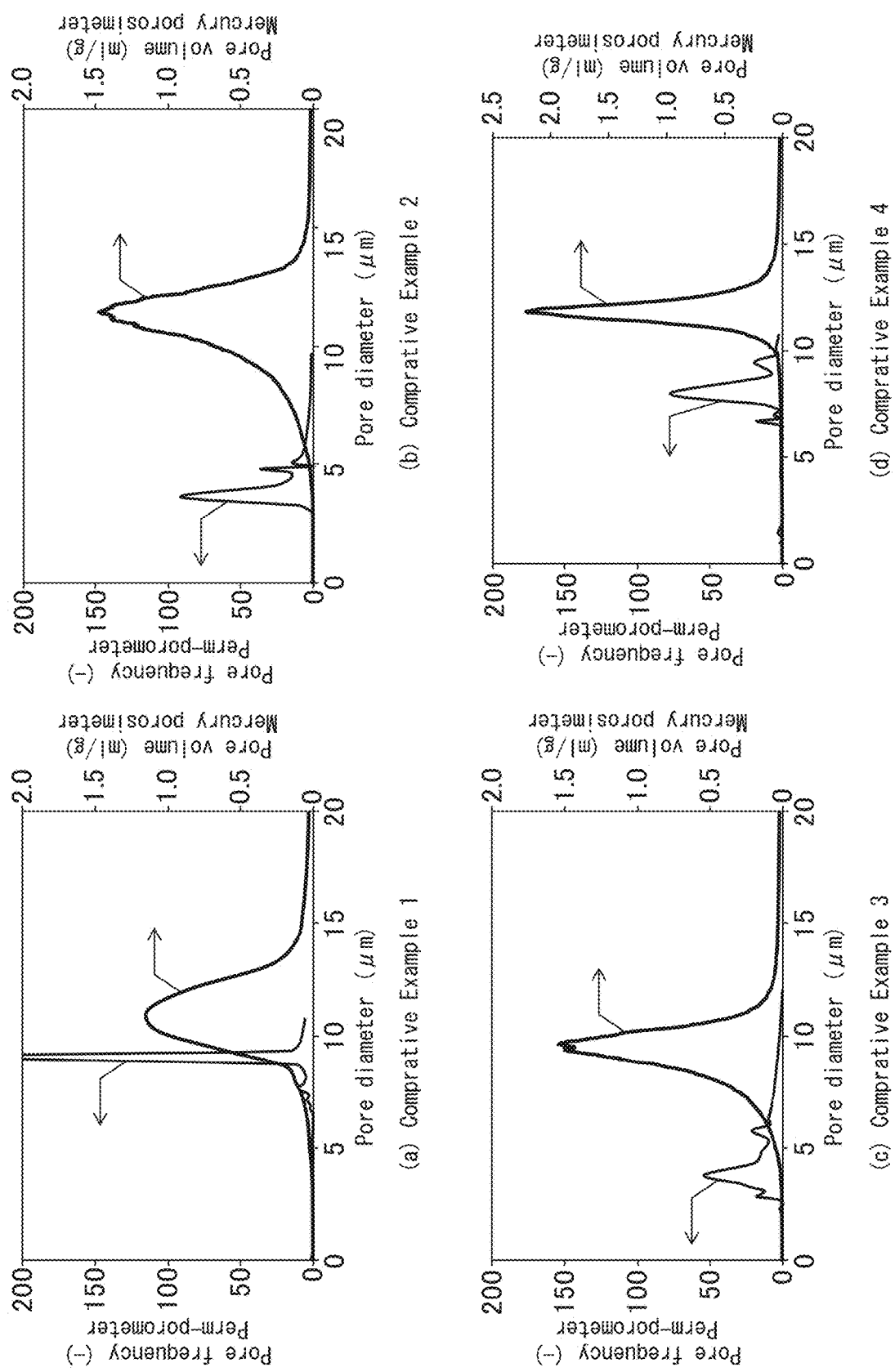
FIG. 5 depicts graphs indicating the distribution of through-pore diameter of partition walls according to a perm-porometer and the distribution of pore diameter according to a mercury porosimeter measured for the exhaust gas purification catalyst devices obtained in Comparative Examples 1 to 4.

The aforementioned exhaust gas purification catalyst device was evaluated in the same manner as Example 1. The results are collectively shown in Table 2 and Table 3. Distribution of through-pore diameter of the partition walls as determined with a perm-porometer and distribution of pore diameter as determined with a mercury porosimeter, which were measured at the time of evaluation, are shown in FIG. 5(a).

Comparative Example 4

(1) Preparation of Coating Slurry

A coating slurry was prepared in the same manner as Example 2 with the exception of changing the amount of Pt—Pd/Al powder used to 200 g and further changing the viscosity of the slurry.

(2) Production of Exhaust Gas Purification Catalyst Device

An exhaust gas purification catalyst device was produced by coating the aforementioned coating slurry onto the same honeycomb substrate as that used in Example 1 followed by baking for 1 hour at 500° C. and forming a coat layer from the surface of the substrate towards the depthwise direction.

(3) Evaluation of Exhaust Gas Purification Catalyst Device

The aforementioned exhaust gas purification catalyst device was evaluated in the same manner as Example 1. The results are collectively shown in Table 2 and Table 3. Distribution of through-pore diameter of the partition walls as determined with a perm-porometer and distribution of pore diameter as determined with a mercury porosimeter, which were measured at the time of evaluation, are shown in FIG. 5(d).

Example 5

An exhaust gas purification catalyst device was produced and evaluated in the same manner as Example 1 with the exception of using a cylindrical SiC honeycomb structure having a diameter of 160 mm and length of 135 mm as a substrate (diesel microparticle collection filter, average pore diameter: 10.5 μm (nominal value), porosity: 41% by volume (nominal value)). The results are collectively shown in Table 2 and Table 3.

Figure 6:
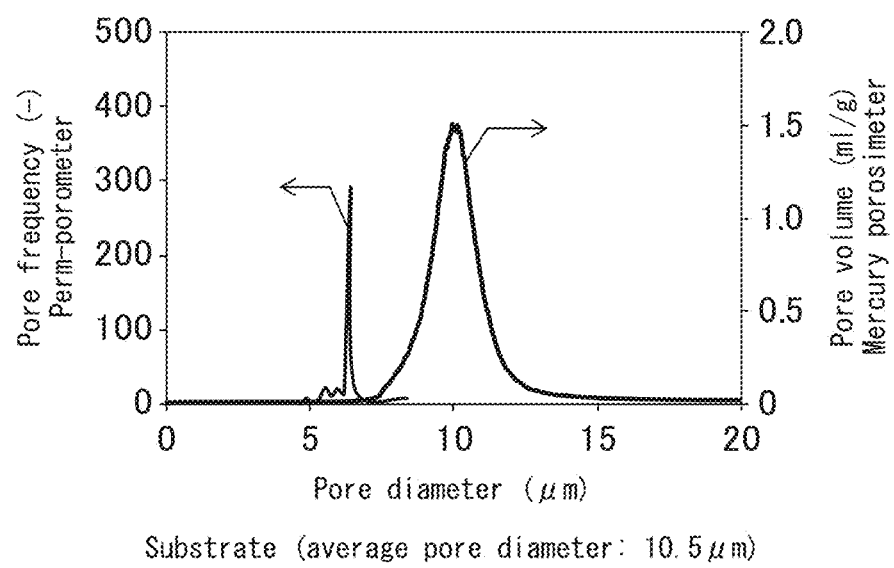
FIG. 6 is a graph indicating the distribution of through-pore diameter of partition walls according to a perm-porometer and the distribution of pore diameter according to a mercury porosimeter measured for the honeycomb substrate used in Examples 5 to 7 and Comparative Examples 5 and 6.
Figure 7:
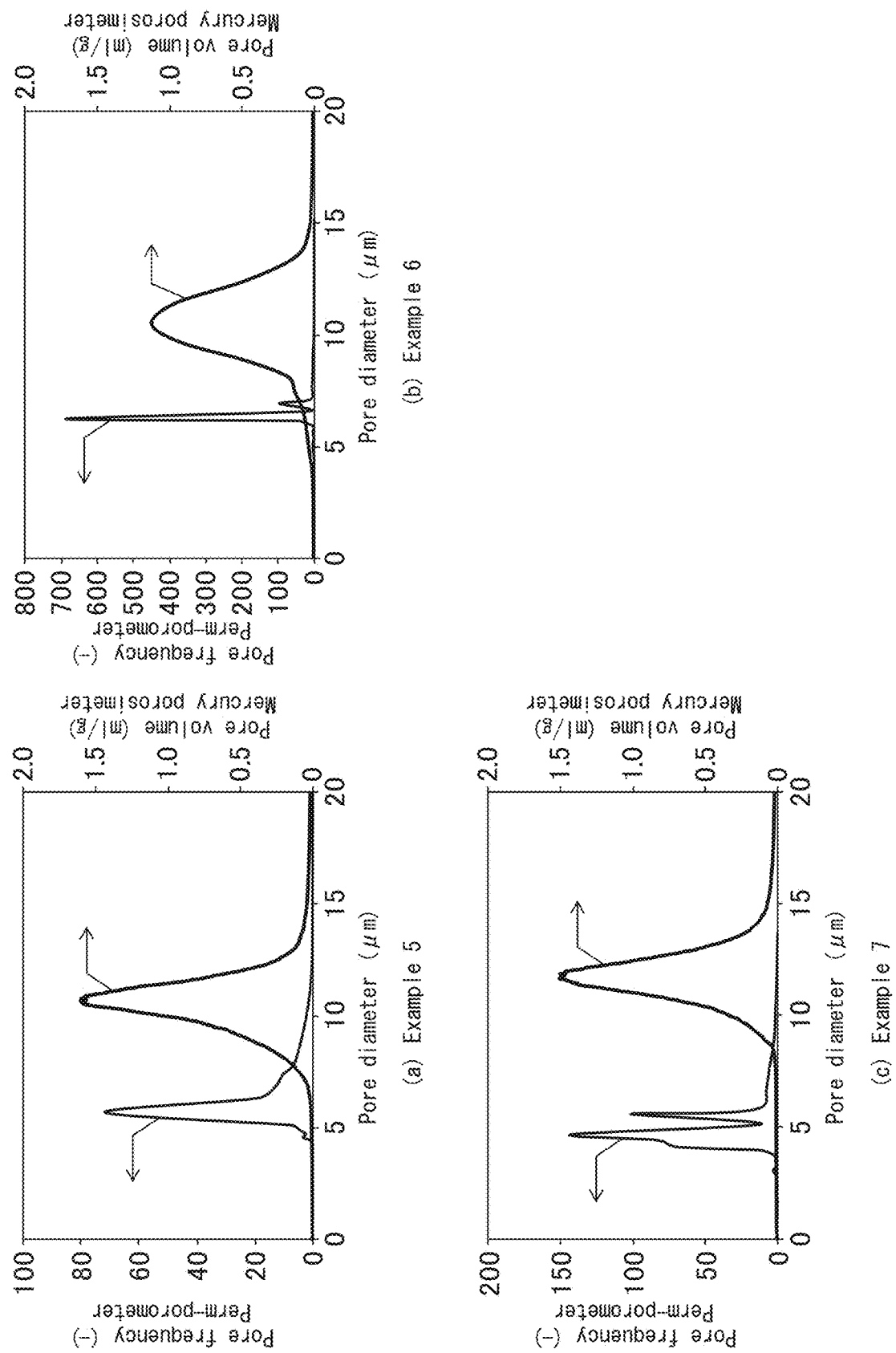
FIG. 7 depicts graphs indicating the distribution of through-pore diameter of partition walls according to a perm-porometer and the distribution of pore diameter according to a mercury porosimeter measured for the exhaust gas purification catalyst devices obtained in Examples 5 to 7.

The distributions of through-pore diameter of the partition walls as determined with a perm-porometer and the distributions of pore diameter as determined with a mercury porosimeter measured for the substrate used are shown in FIG. 6. The distributions of through-pore diameter of the partition walls as determined with a perm-porometer and the distributions of pore diameter as determined with a mercury porosimeter measured for the resulting exhaust gas purification catalyst device are shown in FIG. 7(a).

Examples 6 and 7

Coating slurries were prepared in the same manner as Example 1 with the exception of respectively using pore forming materials having the average particle diameters and in the amounts used shown in Table 1. Exhaust gas purification catalyst devices were produced and evaluated in the same manner as Example 5 with the exception of using these slurries. The results are collectively shown in Table 2 and Table 3. The distributions of through-pore diameter of the partition walls as determined with a perm-porometer and the distributions of pore diameter as determined with a mercury porosimeter measured at the time of evaluation are shown in FIGS. 7(b) and 7(c).

Comparative Example 5

(1) Preparation of Coating Slurry

A coating slurry was prepared in the same manner as Comparative Example 4 with the exception of not using a pore forming material.

(2) Production of Exhaust Gas Purification Catalyst Device

The aforementioned coating slurry was packed into the same substrate as that used in Example 5 and excess slurry was blown off by blowing with air followed by baking for 1 hour at 500° C. to form a coat layer from the surface of the substrate towards the depthwise direction and produce an exhaust gas purification catalyst device.

(3) Evaluation of Exhaust Gas Purification Catalyst Device

Figure 8:
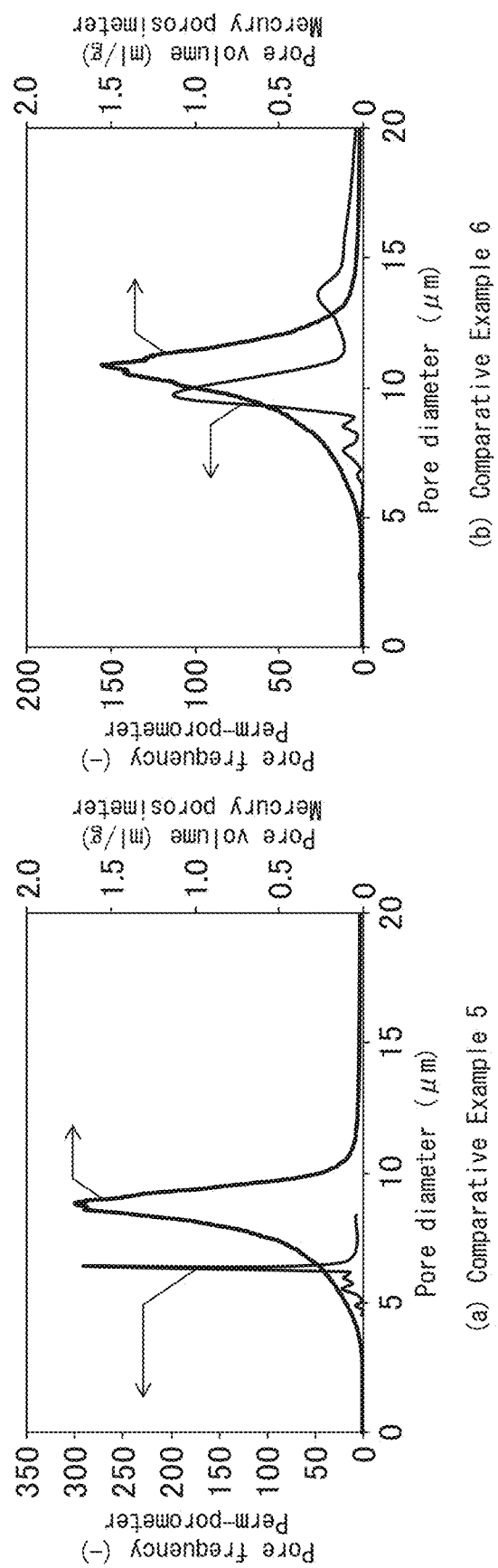
FIG. 8 depicts graphs indicating the distribution of through-pore diameter of partition walls according to a perm-porometer and the distribution of pore diameter according to a mercury porosimeter measured for the exhaust gas purification catalyst devices obtained in Comparative Examples 5 and 6.

The aforementioned exhaust gas purification catalyst device was evaluated in the same manner as Example 1. The results are collectively shown in Table 2 and Table 3. The distribution of through-pore diameter of the partition walls as determined with a perm-porometer and the distribution of pore diameter as determined with a mercury porosimeter measured at the time of evaluation are shown in FIG. 8(a).

Comparative Example 6

(1) Preparation of Coating Slurry 90 g of aluminosilicate fiber having an average diameter of 3 μm and average length of 105 μm, 10 g of silica sol binder and 450 g of pure water were mixed followed by adjusting viscosity by further adding hydroxyethyl cellulose to prepare a coating slurry.

(2) Production of Exhaust Gas Purification Catalyst Device

After coating the aforementioned coating slurry onto the partition walls of the same substrate as that used in Example 5 over 100% of the length of the substrate, the coated substrate was baked for 1 hour at 500° C. to form a coat layer on the surface of the substrate and produce an exhaust gas purification catalyst device.

(3) Evaluation of Exhaust Gas Purification Catalyst Device

The aforementioned exhaust gas purification catalyst was evaluated in the same manner as Example 1. The results are collectively shown in Table 2 and Table 3. The distribution of through-pore diameter of the partition walls as determined with a perm-porometer and the distribution of pore diameter as determined with a mercury porosimeter measured at the time of evaluation are shown in FIG. 8(b).

Example 8

(1) Preparation of Coating Slurry

An aqueous copper (II) sulfate solution was impregnated with CHA type zeolite (Si:Al=6.5:1 (molar ratio)) followed by drying to obtain a CuCHA powder in which copper (II) sulfate was supported at 3.5% by weight as the weight ratio as metal copper to the weight of zeolite. 100 g of this CuCHA powder was mixed with 50 g of ceria-zirconia complex oxide powder followed by adjusting the average particle diameter to 1 μm by milling to obtain a mixed powder. 10 g of alumina sol binder and 300 g of pure water were added to 150 g of this mixed powder followed by mixing to obtain a slurry.

Styrene-acrylic resin particles as pore forming material were added to the aforementioned slurry followed by further adjusting the viscosity and obtain a coating slurry. The average particle diameter of the styrene-acrylic resin particles used was 100 nm and the ratio at which the styrene-acrylic resin particles were used was 10% by weight based on the total solid content in the resulting coating slurry.

(2) Production of Exhaust Gas Purification Catalyst Device

A cylindrical SiC honeycomb structure having a diameter of 160 mm and length of 135 mm was used as a substrate (diesel microparticle collection filter, average pore diameter: 20 μm (nominal value), porosity: 60% by volume (nominal value)). An exhaust gas purification catalyst device was produced in the same manner as Example 1 with the exception of using this substrate and the aforementioned coating slurry and making the coating length to extend to 80% of the length of the substrate from the upstream side of exhaust gas flow.

(3) Evaluation of Exhaust Gas Purification Catalyst Device

Figure 9:
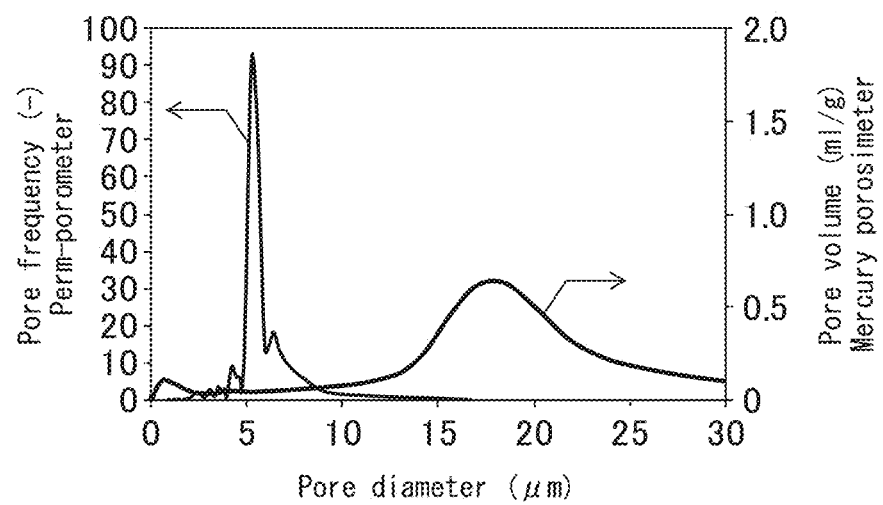
FIG. 9 is a graph indicating the distribution of through-pore diameter of partition walls according to a perm-porometer and the distribution of pore diameter according to a mercury porosimeter measured for the exhaust gas purification catalyst device obtained in Example 8.

The aforementioned exhaust gas purification catalyst device was evaluated in the same manner as Example 1. The results are collectively shown in Table 2 and Table 3. The distribution of through-pore diameter of the partition walls as determined with a perm-porometer and the distribution of pore diameter as determined with a mercury porosimeter measured at the time of evaluation are shown in FIG. 9.

TABLE 1

|  | Substrate | | Coat Layer Formation | | | |
|---|---|---|---|---|---|---|
|  |  |  | Coating slurry Pore forming material | | | |
|  | Pore diameter (nominal value) | Porosity (nominal value) | Avg. particle diameter | Usage ratio | Coated width (from upstream side) | Coated amount (upstream side) |
| Example 1 | 12 μm | 42 vol % | 100 nm | 30 wt % | 90% | 7.9 g/L |
| Example 2 | 12 μm | 42 vol % | 100 nm | 20 wt % | 90% | 7.9 g/L |
| Example 3 | 12 μm | 42 vol % | 100 nm | 30 wt % | 70% | 7.9 g/L |
| Example 4 | 12 μm | 42 vol % | 100 nm | 30 wt % | 90% | 10 g/L |
| Comp. Ex. 1 | 12 μm | 42 vol % | — | 0 | 100% | 15 g/L |
| Comp. Ex. 2 | 12 μm | 42 vol % | — | 0 | 90% | 7.9 g/L |
| Comp. Ex. 3 | 12 μm | 42 vol % | — | 0 | 90% | 20 g/L |
| Comp. Ex. 4 | 12 μm | 42 vol % | 100 nm | 20 wt % | 90% | 20 g/L |
| Example 5 | 10.5 μm | 41 vol % | 100 nm | 30 wt % | 90% | 7.9 g/L |
| Example 6 | 10.5 μm | 41 vol % | 30 nm | 30 wt % | 90% | 7.9 g/L |
| Example 7 | 10.5 μm | 41 vol % | 300 nm | 15 wt % | 90% | 7.9 g/L |
| Comp. Ex. 5 | 10.5 μm | 41 vol % | — | 0 | 100% | 20 g/L |
| Comp. Ex. 6 | 10.5 μm | 41 vol % | — | 0 | 100% | 20 g/L |
| Example 8 | 20 μm | 60 vol % | 100 nm | 30 wt % | 80% | 7.9 g/L |

TABLE 2

|  | Range of coat layer | Catalyst Device | | | Effective |
|---|---|---|---|---|---|
|  |  | Peak pore diameter | | | |
|  | (depth present from inlet side cell surface) | Hg porosimeter | Perm-porometer | Difference | through-pore diameter |
| Substrate | — | 12.0 μm | 9.52 μm | 2.48 μm | 14 vol % |
| Example 1 | 8% | 11.8 μm | 7.61 μm | 4.19 μm | 96 vol % |
| Example 2 | 10% | 12.0 μm | 6.94 μm | 5.06 μm | 95 vol % |
| Example 3 | 20% | 11.1 μm | 7.63 μm | 3.47 μm | 95 vol % |
| Example 4 | 30% | 11.8 μm | 5.67 μm | 6.13 μm | 84 vol % |
| Comp. Ex. 1 | 100% | 11.1 μm | 9.06 μm | 2.04 μm | 8 vol % |
| Comp. Ex. 2 | 10% | 11.4 μm | 4.79 μm | 6.61 μm | 35 vol % |
| Comp. Ex. 3 | 22% | 9.7 μm | 3.77 μm | 5.93 μm | 46 vol % |
| Comp. Ex. 4 | 30% | 11.8 μm | 7.98 μm | 3.82 μm | 75 vol % |
| Substrate | — | 10.1 μm | 6.41 μm | 3.72 μm | 100 vol % |
| Example 5 | 10% | 10.8 μm | 5.68 μm | 5.12 μm | 98 vol % |
| Example 6 | 10% | 10.5 μm | 6.24 μm | 4.26 μm | 96 vol % |
| Example 7 | 10% | 11.6 μm | 4.67 μm | 6.93 μm | 91 vol % |

TABLE 2-continued

| | Range of coat layer (depth present from inlet side cell surface) | Catalyst Device | | | Effective through-pore diameter |
| --- | --- | --- | --- | --- | --- |
| | | Peak pore diameter | | | |
| | | Hg porosimeter | Perm-porometer | Difference | |
| Comp. Ex. 5 | 100% | 8.7 μm | 6.41 μm | 2.29 μm | 90 vol % |
| Comp. Ex. 6 | 0% (on substrate surface) | 11 μm | 9.76 μm | 1.24 μm | 20 vol % |
| Example 8 | 20% | 16 μm | 5.24 μm | 10.76 μm | 90 vol % |

TABLE 3

| | Pressure Loss | | |
| --- | --- | --- | --- |
| | Before PM collection | After PM collection | Difference |
| Example 1 | 0.13 kPa | 3.90 kPa | 3.77 kPa |
| Example 2 | 0.13 kPa | 3.90 kPa | 3.77 kPa |
| Example 3 | 0.12 kPa | 3.69 kPa | 3.57 kPa |
| Example 4 | 0.12 kPa | 3.72 kPa | 3.60 kPa |
| Comparative Example 1 | 0.16 kPa | 4.80 kPa | 4.64 kPa |
| Comparative Example 2 | 0.15 kPa | 4.50 kPa | 4.35 kPa |
| Comparative Example 3 | 0.23 kPa | 6.75 kPa | 6.52 kPa |
| Comparative Example 4 | 0.17 kPa | 5.01 kPa | 4.84 kPa |
| Example 5 | 0.12 kPa | 3.57 kPa | 3.45 kPa |
| Example 6 | 0.13 kPa | 3.84 kPa | 3.71 kPa |
| Example 7 | 0.13 kPa | 3.81 kPa | 3.68 kPa |
| Comparative Example 5 | 0.15 kPa | 4.56 kPa | 4.41 kPa |
| Comparative Example 6 | 0.17 kPa | 5.10 kPa | 4.93 kPa |
| Example 8 | 0.13 kPa | 3.99 kPa | 3.86 kPa |

<Backscattered Electron Images>

Figure 10:
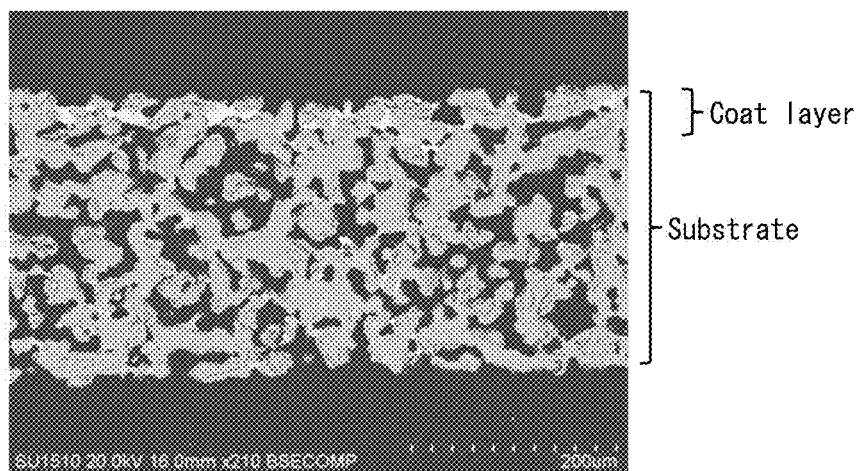
FIG. 10 depicts SEM images (backscattered electron images) of the exhaust gas purification catalyst devices obtained in Examples 1 and 4.
Figure 10:
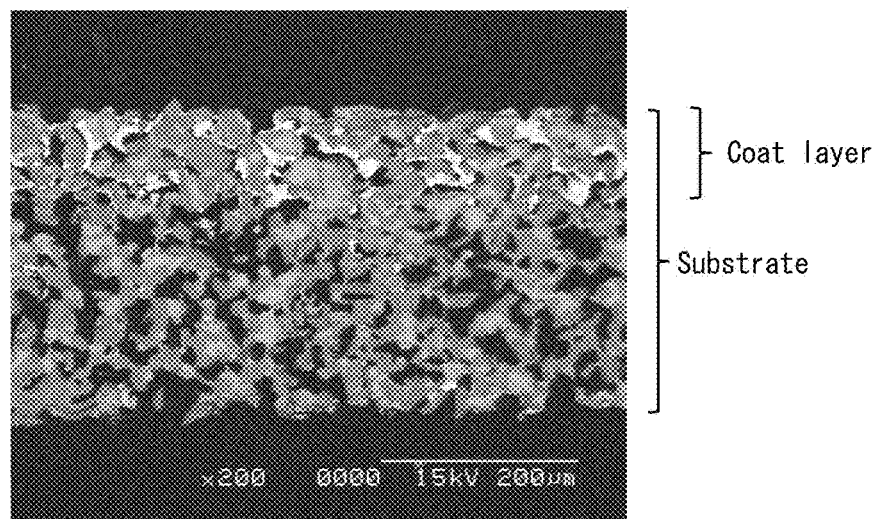

Backscattered electron images of the exhaust gas purification catalyst devices respectively produced in Example 1 and Example 4 are shown in FIGS. 10(a) and 10(b). The areas that appear gray in these images indicate the substrate while the white regions indicate the coat layer.

REFERENCE SIGNS LIST

1 PM
10 Honeycomb substrate
11,12 Sealing portions
20 Inlet side coat layer
30 Cell
31 Inlet side cell
32 Outlet side cell
50 Exhaust gas flow
100 Exhaust gas purification catalyst device

The invention claimed is:

1. An exhaust gas purification catalyst device having a honeycomb substrate and an inlet side coat layer; wherein
the honeycomb substrate has a plurality of cells partitioned by porous partition walls, and this plurality of cells includes inlet side cells, which are open on the upstream side of exhaust gas flow and sealed on the downstream side, and outlet side cells, which are sealed on the upstream side of exhaust gas flow and open on the downstream side, and are configured such that exhaust gas that has flowed into the inlet side cells as a result thereof passes through the partition walls and is discharged from the outlet side cells,
the inlet side coat layer is present on the surface sides of the partition walls of the inlet side cells
the proportion of through-pores having a diameter of 4 μm or more to 9 μm or less in the distribution of the through-pore diameter of the partition walls as measured according to the bubble point method using a perm-porometer is 80% by volume or more, and
the peak pore diameter as measured according to the mercury intrusion method using a mercury porosimeter is 3.0 μm or more larger than the peak through-pore diameter measured according to the bubble point method using a perm-porometer.

2. The catalyst device according to claim 1, wherein the inlet side coat layer is present only within a range from the partition wall surfaces of the inlet side cells to a depth of 30% of the partition wall thickness.

3. The catalyst device according to claim 2, wherein the inlet side coat layer is present only within a range from the partition wall surfaces of the inlet side cells to a depth of 10% of the partition wall thickness.

4. The catalyst device according to claim 1, wherein the peak pore diameter measured according to the mercury intrusion method using a mercury porosimeter is 9 μm or more.

5. The catalyst device according to claim 1, wherein the inlet side coat layer is present over a length of 70% or more of the length of the honeycomb substrate from the upstream side end of exhaust gas flow of the honeycomb substrate.

6. The catalyst device according to claim 1, wherein the inlet side coat layer is present over a length of 98% or more of the length of the honeycomb substrate from the upstream side end of exhaust gas flow of the honeycomb substrate.

7. The catalyst device according to claim 1, further having an outlet side coat layer present on the surfaces or insides of the partition walls of the outlet side cells.

8. A method for producing the exhaust gas purification catalyst device according to claim 1, wherein
the production method comprises forming a slurry coat layer by coating a slurry for coat layer formation within the inlet side cells of the honeycomb substrate and baking the honeycomb substrate after forming the slurry coat layer, and
the slurry for coat layer formation contains inorganic oxide particles and a pore forming material.

9. The method according to claim 8, wherein the pore forming material is an organic polymer particle.

10. The method according to claim 8, wherein the average particle diameter of the pore forming material is 10 nm or more to 500 nm or less.

11. The method according to claim 8, wherein the amount of the slurry coat layer per unit volume of the honeycomb substrate after baking is 1 g/L or more to 15 g/L or less.

* * * * *